United States Patent [19]
Jimenez

[11] Patent Number: 5,119,767
[45] Date of Patent: Jun. 9, 1992

[54] CHILD SAFETY DEVICES

[76] Inventor: Hector J. G. Jimenez, Matias Romero 84-2 Col. Del Valle C.P. 013100, Mexico City, Mexico

[21] Appl. No.: 624,479

[22] Filed: Dec. 10, 1990

Related U.S. Application Data

[63] Continuation of Ser. No. 240,669, Sep. 6, 1988, abandoned.

[30] Foreign Application Priority Data

Aug. 16, 1988 [MX] Mexico ................................. 12696

[51] Int. Cl.⁵ ................... A01K 29/00; A61G 1/00; B60R 22/10; B60R 22/26
[52] U.S. Cl. ..................... 119/96; 297/484; 294/140; 280/290
[58] Field of Search .................. 119/96, 29; 128/869–876, 846; 2/44, 45; 182/3, 4; 224/257–259; 244/151 R; 272/70, 109; 280/290; 294/140; 297/484

[56] References Cited

U.S. PATENT DOCUMENTS

| | | | |
|---|---|---|---|
| 2,877,833 | 3/1959 | Boles | 297/484 |
| 3,321,247 | 5/1967 | Dillender | 297/484 |
| 3,954,280 | 5/1976 | Roberts et al. | 297/484 |
| 4,487,201 | 12/1984 | Ciambarella | 128/876 |
| 4,709,966 | 12/1987 | Parkinson et al. | 297/484 |
| 4,728,553 | 3/1988 | Daniels | 128/876 |

FOREIGN PATENT DOCUMENTS

| | | | |
|---|---|---|---|
| 961460 | 1/1975 | Canada | 119/96 |
| 1437086 | 5/1976 | United Kingdom | 119/96 |

*Primary Examiner*—John G. Weiss
*Attorney, Agent, or Firm*—Bradford E. Kile

[57] ABSTRACT

A child safety device employing lightweight adjustable straps and hook and loop type fasteners to facilitate placement and removal of a child from the device. A child is placed within the harness and then left, right, and bottom straps are fastened with one motion producing a convenient and compact child restraint.

1 Claim, 4 Drawing Sheets

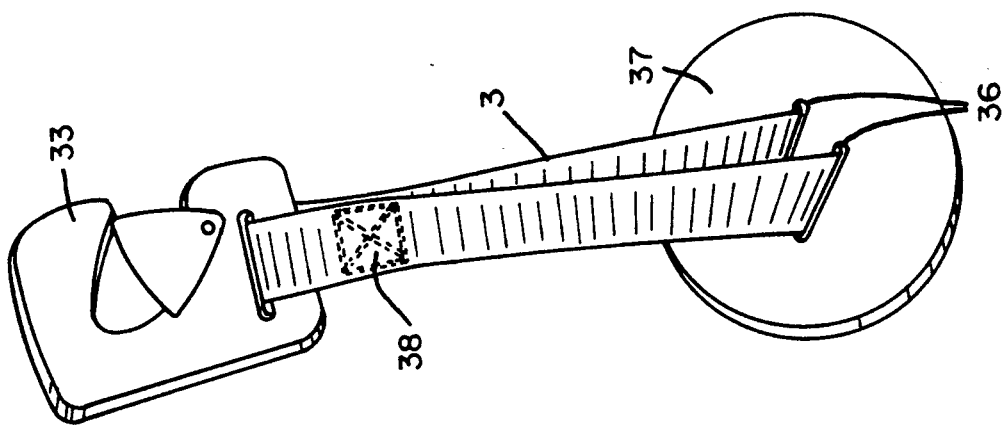
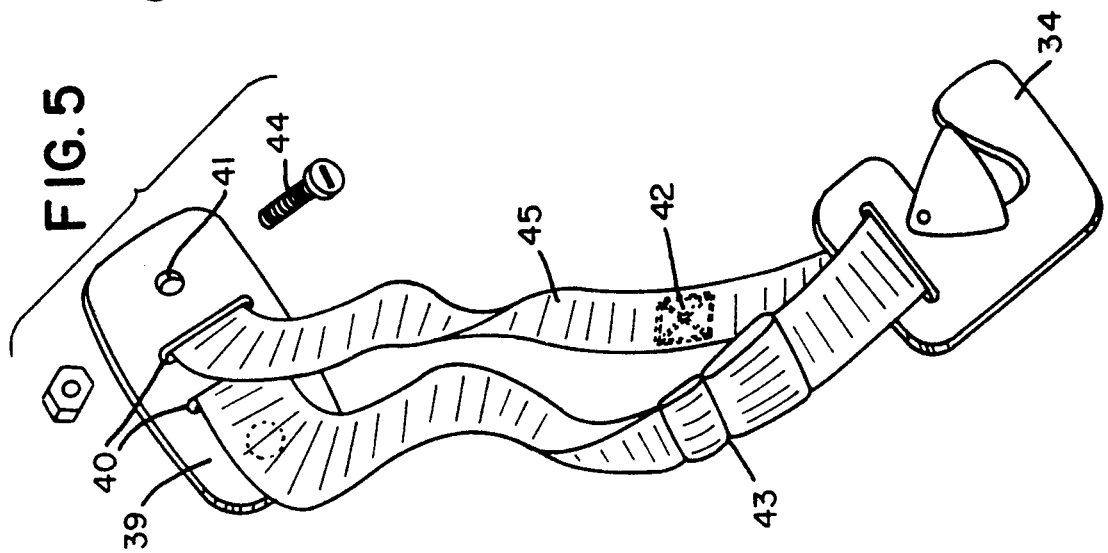
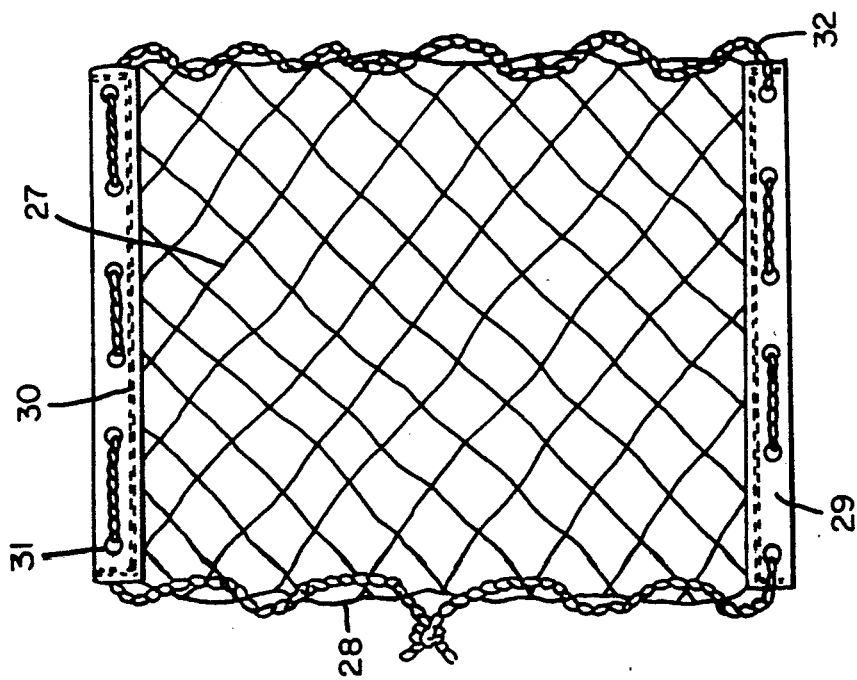

CHILD SAFETY DEVICES

This application is a continuation of application Ser. No. 240,669, filed Sep. 6, 1988, now abandoned.

BACKGROUND OF THE INVENTION

The improvements in child safety devices described herein have basically the same objective as my application filed on even date herewith. The safety device is designed for use in passenger vehicles and is mainly for use with infants.

The parts forming or comprising the device make it possible to keep the child strapped to the seat of the vehicle in the event of a sudden stop. The purpose of the improvements is to make the device lighter and to facilitate its initial placement in the vehicle and removal therefrom, as well as to provide a new accessory (net type) for transporting a baby in its carrier with maximum safety.

Other objectives of the child safety device are to maintain the child close to the mother, to provide a means of support while teaching it to walk, to swim, and for other training purposes. The netting can also be used to carry any type of object, strapped to the seat of the vehicle, to eliminate the danger of falling and breaking.

SUMMARY OF THE INVENTION

Most vehicles are not equipped with child safety devices. Generally, car seats of many types have been used which are usually only for babies or small children. Not only do these seats take up a great deal of space inside the vehicle (even in the trunk), they are typically cumbersome and expensive. Morever, the rear seat belts in some automobiles do not include an upper part of the belt or a crotch strap, which makes them less advantageous since pressure is exerted solely on the abdomen. The child safety device of this invention distributes the pressure evenly between the abdomen and the thorax, thus reducing the risk of intestinal or other internal ruptures.

The primary objective of this invention is to provide an anatomical safety device for children that is lightweight, is easy for a child to use and is extremely safe.

The improvement includes a two-layer chest pad, the layers of which are joined by means of a contact material such as Velcro brand hook and loop type fastener. This will avoid the weight of safety buckles and will better distribute the pressure on the body of the user and will make the device easier for a child to use—all without a decrease in safety.

The need to protect the baby in its carrier is fulfilled by a design which permits adaptation to the shape of the baby carrier (without strangulation) and to provide a secure attachment by means of a cord to the safety hook to which the chest pad is connected. Because the netting readily conforms to any shape, it can be used to carry a wide variety of objects inside the vehicle without the danger of falling and breaking.

BRIEF DESCRIPTION OF THE DRAWINGS

FIG. 4 is an enlarged plan view of an element of the safety device;

FIG. 5 is a perspective of another element of the safety device; and

FIG. 6 is a perspective of yet another element of the safety device.

DETAILED DESCRIPTION OF THE PREFERRED EMBODIMENT

Figure 1:
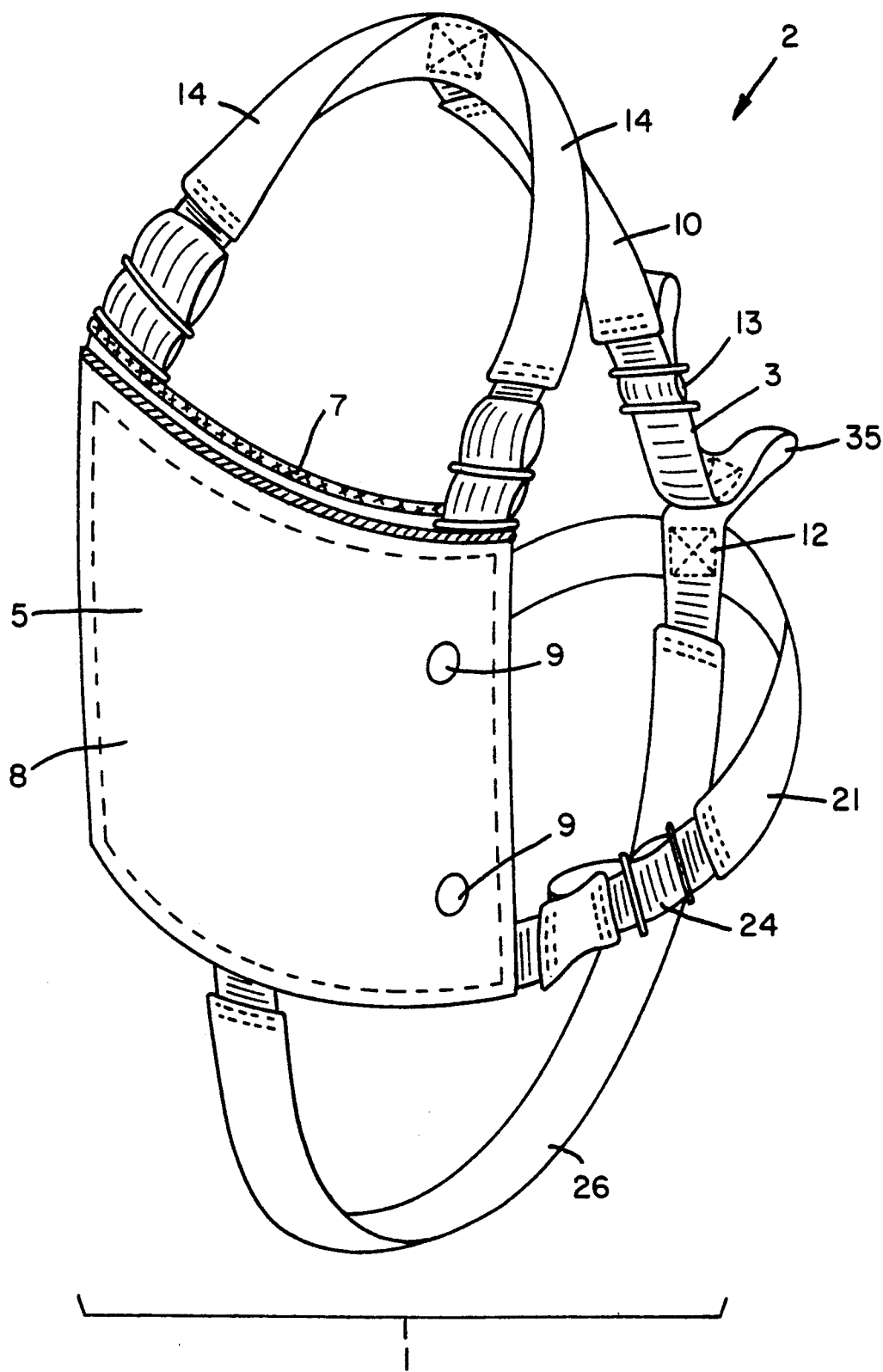
FIG. 1 is a perspective view of the invention.

When referring to the drawings, the like parts are indicated to by like numerals.

Figure 2:
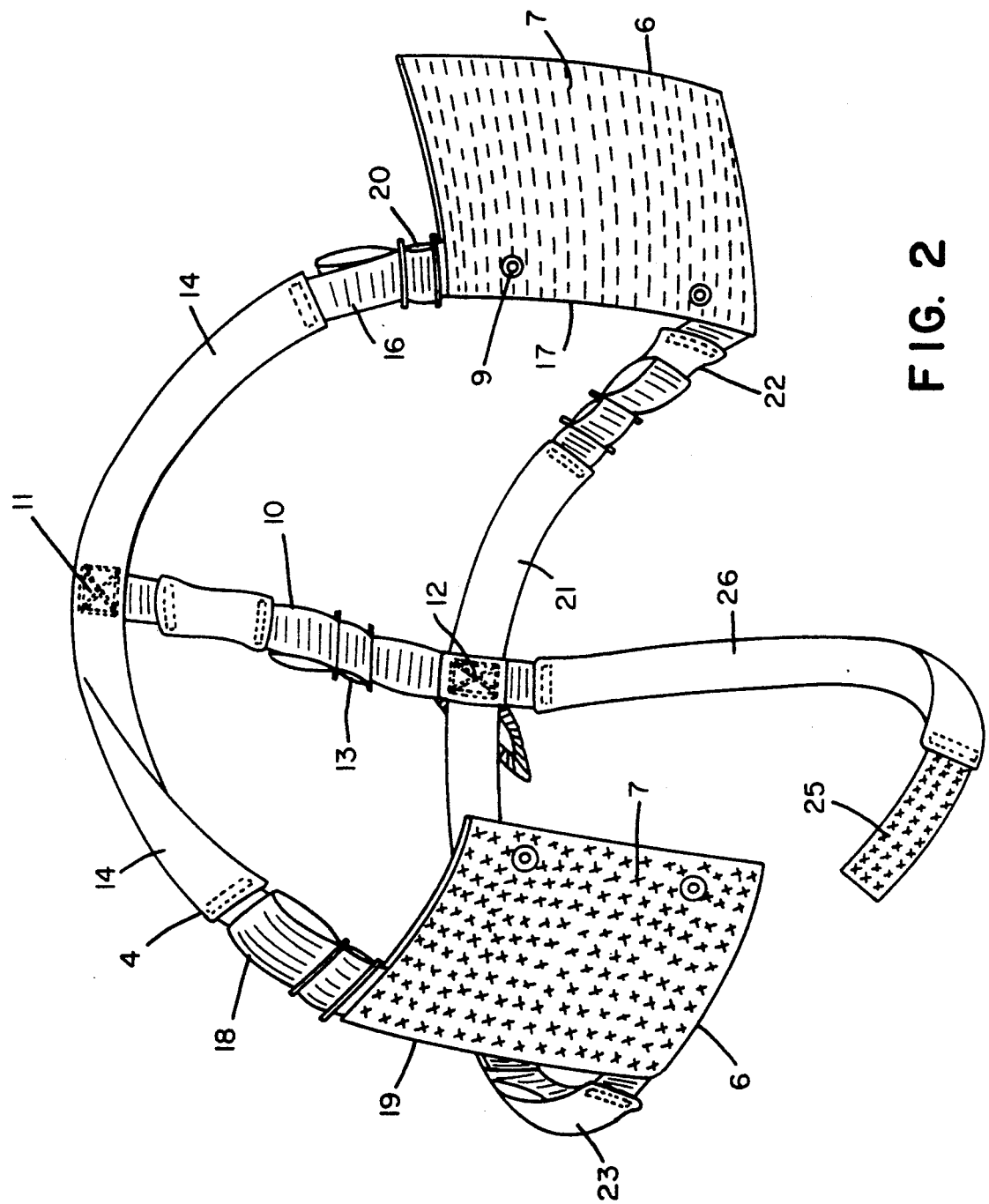
FIG. 2 is a perspective view of the invention with certain parts disconnected.
Figure 3:
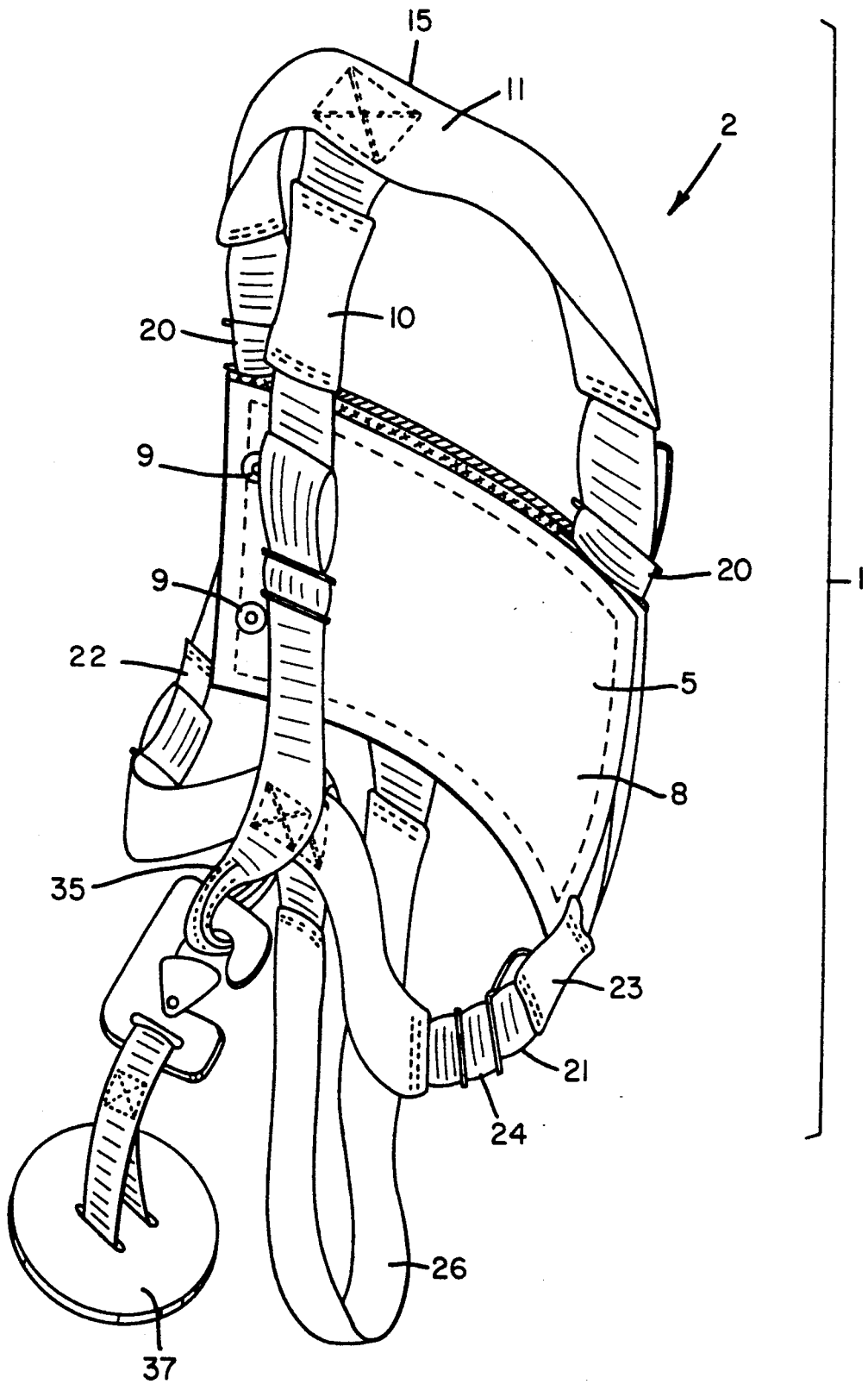
FIG. 3 is a rear perspective of the device shown in FIGS. 1 and 2.

The safety device has a main body part referred to by the numeral 1. Body 1 consists of a harness 2, the frame of which forms a rigid safety strap 3 (FIGS. 1-6) approximately one to two (1-2) inches wide, the different sections of which are connected either by rivets or by sewing with a high-strength synthetic thread such as nylon, etc. These sections are covered entirely, or partially, with a quilted fabric that encases the safety strap 4 (FIG. 2), thus making it comfortable and attractive.

The chest pad 5 (FIGS. 1-3) consists of two layers 6 (FIG. 2) made of high-strength material, the adjoining surfaces of which are joined by means of a Velcro brand hook and loop type fastener contact material (FIGS. 1-2), the exterior surfaces of which are covered with a fabric 8 (FIGS. 1-3) and near the left edge of the chest pad are two snaps 9 (FIGS. 1-3) which facilitate the proper alignment of the layers 6.

The attachment of the pad to the rest of the harness is shown in the drawings. The top end of the back safety strap (back trace) 10 (FIGS. 1-3) is sewn with nylon thread to the shoulder strap 11 (FIGS. 2-3), and the bottom end is sewn to the inside rear middle section 12 (FIGS. 1-2) of the belt. The strap 11 may be lengthened or shortened by means of an adjustment buckle 13. In the front of the device are two parallel straps or front traces which form a "U" behind the neck 15 (FIGS. 1-2), the ends of which are attached to the chest pad. The left trace 16 (FIG. 2) is attached to the left edge 17 (FIG. 2) of the outer layer of the pad and the right trace 18 (FIG. 2) is attached to the right edge 19 (FIG. 2) of the inner layer of the chest pad. The parallel straps are equipped with an adjustment buckle 20 (FIGS. 2-3) by means of which they can be lengthened or shortened. Around the waist is a safety strap in the form of a belt 12 (FIGS. 1-3), the ends of which are attached to the chest pad in the following manner: The left end 22 (FIGS. 2-3) extends along the lower edge of the outer layer (up to the midpoint of that layer) and the right end 23 (FIGS. 2-3) extends along the lower edge of the inner layer (up to the midpoint of that layer). It should be noted that both layers of the chest pad have a rigid reinforcing strip at their upper edges, extending from their respective trace to the middle section of each layer. On both sides of the chest pad the belt is equipped with an adjustment buckle 24 (FIGS. 1-3) by means of which it can be lengthened or shortened. A rigid crotch strap 26 extends from the rear middle section of the belt (after forming the intermediate part of the device) to the point where it is attached to the chest pad a 15 cm. length of contact material 25.

Netting was designed as shown in FIG. 4 and consists of the following: a nylon net fabric or cloth 27 (FIG. 4) of approximately 60×100 cms., with two of its opposite edges reinforced at 28 (FIG. 4) naturally and the last 2-3 cms. of the other ends covered with laminated plastic 29 sewn in place with nylon thread 30, and which contain 8 to 12 eyelets 31 spaced equidistantly, through which a nylon cord 32 is passed, which is then interwoven into the natural reinforcement of the netting. By pulling on the ends of the cord 32, the netting conforms to or enfolds the baby carrier. Then, the cord is attached to the safety hook 33-34 (FIGS. 5-6) to which the harness of the child safety device is attached.

An intermediate part is formed by the continuation of the back strap or trace, before the latter is sewn to the belt with nylon thread. This intermediate part 35 is in shape of a handle, which serves as the point of attachment to the safety hook 33-34 of the anchored part to make the device a single unit.

The invention also has improved anchoring. The improvement consists of forming two slots in the stationary part or safety disk 37 through which the safety strap passes. This eliminates the need for rivets; the use of an adjustment buckle for lengthening or shortening the strap between the safety hook 33 (FIG. 6) and the disk is optional. The two safety part being thus connected, the ends of the strap are sewn together with nylon thread 38. Both the safety hook and the disk are made of a material that is highly resistant to pulling, twisting and bending such as metal or high-strength plastic. The shape of the anchored part is variable, generally circular and with an approximate diameter of 10 cms. This part is inserted horizontally between the seat back and the seat of the vehicle, and after passing behind the seat is turned vertically to keep it from slipping back through, leaving only the safety hook visible.

The easy adaptation of this part to any type of vehicle makes it a portable method of child safety.

An extension is shown in FIG. 5. A steel safety plate 39, rectangular in shape, 6-8 cms. wide and 8-12 cms. long, with two slots near the center 40 (FIG. 5) and a hole near each end 41 (FIG. 5). Through said slots pases a safety strap approximately 100-150 cms. long, which strap is attached to a safety hook 34 (FIG. 5) and the ends of which are sewn together with nylon thread 42 (FIG. 5). This strap has an adjustment buckle shortened. The purpose of this improvement is to provide for the child safety device a part for anchoring it permanently to the body of the automobile by means of screws 44 which pass through the holdes of the safety plate, thus providing the anchoring strength necessary for extreme stresses.

The length of the strap 45 in FIG. 5 and its adjustment buckle permits attaching the anchored part of the child safety device to the floor or in the trunk of the vehicle.

In a general manner, while there has been disclosed an effective and efficient embodiment of the invention, it should be well understood that the invention is not limited to such an embodiment as there might be changes made in the arrangement, disposition and form of the parts without departing from the principle of the present invention as comprehended with the scope of the accompanying claims.

I claim:

1. A child restraint device for use in automobiles comprising:

a restraint pad adapted to be placed adjacent the torso of a child and having a front layer and a rear layer;

said front and rear layers having hook and loop fasteners disposed on respective opposing surfaces thereof forming a first releasable attachment means for releasably attaching said front layer to said rear layer;

an upper restraint strap having first and second ends adapted to be placed over the neck of a child;

first means for affixing said first end to said rear layer;

second means for affixing said second end to said front layer;

a connector crotch strap having third and fourth ends;

third means for affixing said third end to said upper restraint strap between said first and second ends;

second releasable attachment means comprising hook and loop fasteners disposed on said fourth end for releasably affixing said fourth end between said front and rear layers;

a rear restraint strap having fifth and sixth ends adapted to be placed around the rear of the abdomen of a child;

fifth means for affixing said fifth end to said front layer;

sixth means for affixing said sixth end to said rear layer;

an attachment loop fixedly attached to said connector strap;

automobile attachment means for securely attaching said connector strap and said rear restraint strap to said automobile to effectively restrain a child during accidents;

wherein said automobile attachment means comprises a safety hook for selectively engaging said attachment loop at a first end of said attachment means.

* * * * *